United States Patent
Nakajima

(10) Patent No.: US 6,690,492 B2
(45) Date of Patent: *Feb. 10, 2004

(54) IMAGE PROCESSING METHOD AND APPARATUS

(75) Inventor: Satoru Nakajima, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,982

(22) Filed: May 4, 1999

(65) Prior Publication Data

US 2003/0076539 A1 Apr. 24, 2003

(30) Foreign Application Priority Data

May 11, 1998 (JP) .......................... 10-127846

(51) Int. Cl.[7] .............................. H04N 1/40
(52) U.S. Cl. ................. 358/462; 382/171; 382/173
(58) Field of Search ................. 358/453, 462; 382/168, 170, 171, 173, 176

(56) References Cited

U.S. PATENT DOCUMENTS

| | | | | |
|---|---|---|---|---|
| 5,369,716 A | * | 11/1994 | Sangu | 382/317 |
| 5,680,479 A | | 10/1997 | Wang et al. | 382/176 |
| 5,999,646 A | * | 12/1999 | Tamagaki | 382/169 |
| 6,005,679 A | * | 12/1999 | Haneda | 358/453 |
| 6,072,941 A | * | 6/2000 | Suzuki et al. | 358/462 |
| 6,104,832 A | * | 8/2000 | Saito et al. | 382/176 |

FOREIGN PATENT DOCUMENTS

JP   6-68301   3/1994

* cited by examiner

Primary Examiner—Thomas D. Lee
(74) Attorney, Agent, or Firm—Fitzpatrick, Cella, Harper & Scinto

(57) ABSTRACT

According to this invention, in order to efficiently output images, when an image and its attribute are selected, and an extraction output instruction of an image region with the selected attribute is issued, the selected image is segmented into image regions with different attributes, and an image region with the selected attribute is extracted and displayed from the segmented image regions.

13 Claims, 15 Drawing Sheets

FIG. 4

DOCUMENT MANAGEMENT TABLE

| DELETE | IMAGE INDEX PATTERN | KEYWORD | KEY NO. | DATE OF CREATION | DATE OF UPDATE | TOTAL NUMBER OF PAGES | PAGE NUMBER |
|---|---|---|---|---|---|---|---|
| 1 | 100100------ | PARTS CATALOG | 337 | 91.05.02 | 92.01.08 | 3 | 1 |
| 1 | 100010------ | PARTS DRAWING | 150 | 91.02.05 | 92.03.20 | 2 | 4 |
| ...... | ...... | ...... | ...... | ...... | ...... | ...... | ...... |
| 1 | 010000------ | REPORT | 110 | 90.01.25 | 90.01.26 | 2 | 8 |
| 1 | 100010------ | PARTS DRAWING | 151 | 92.02.07 | 92.03.21 | 2 | 10 |
| ...... | ...... | ...... | ...... | ...... | ...... | ...... | ...... |

FIG. 5

PAGE MANAGEMENT TABLE

| PAGE NUMBER | DELETE | OBVERSE / REVERSE MODE | OTHER IMAGE INFORMATION | NODE NUMBER |
|---|---|---|---|---|
| 1 | 1 | ONE-SIDED | ~~~~~~~ | 5 |
| 2 | 1 | ONE-SIDED | ~~~~~~~ | 6 |
| 3 | 1 | ONE-SIDED | ~~~~~~~ | 7 |
| 4 | 1 | DOUBLE-SIDED | ~~~~~~~ | 12 |
| 5 | 1 | DOUBLE-SIDED | ~~~~~~~ | 13 |
| ⋮ | ⋮ | ⋮ | ⋮ | ⋮ |
| 8 | 0 | ONE-SIDED | ~~~~~~~ | 1 |
| 9 | 0 | ONE-SIDED | ~~~~~~~ | 2 |
| 10 | 1 | DOUBLE-SIDED / OBVERSE | ~~~~~~~ | 20 |
| 11 | 1 | DOUBLE-SIDED / REVERSE | ~~~~~~~ | 20 |
| ⋮ | ⋮ | ⋮ | ⋮ | ⋮ |

FIG. 6

NODE TABLE

| NODE NUMBER | DATA SIZE | FAT ENTRY |
|---|---|---|
| 1 | 87654 | 23B6 |
| 2 | 56789 | 3342 |
| ⋮ | ⋮ | ⋮ |
| 5 | 76543 | 5658 |
| 6 | 23599 | 56A0 |
| 7 | 98765 | 570C |
| ⋮ | ⋮ | ⋮ |
| 12 | 89765 | 62B0 |
| 13 | 98752 | 632B |
| ⋮ | ⋮ | ⋮ |
| 20 | 87875 | 5086 |
| ⋮ | ⋮ | ⋮ |

HALFTONE FIGURE
(PHOTOGRAPH)

FIG. 12

TEXT BLOCK MANAGEMENT TABLE

| ID | LAYOUT ANALYSIS RESULT DATA | PAGE NUMBER |
|---|---|---|
| 1 | ~ ~ ~ ~ ~ ~ ~ ~ ~ ~ ~ | 1 |
| 2 | ~ ~ ~ ~ ~ ~ ~ ~ ~ ~ | 1 |
| 3 | ~ ~ ~ ~ ~ ~ ~ ~ ~ ~ ~ | 1 |
| 4 | ~ ~ ~ ~ ~ ~ ~ ~ ~ ~ | 1 |
| 5 | ~ ~ ~ ~ ~ ~ ~ ~ ~ | 1 |
| 6 | ~ ~ ~ ~ ~ ~ ~ ~ ~ ~ | 2 |
| 7 | ~ ~ ~ ~ ~ ~ ~ ~ ~ ~ | 2 |
| 8 | ~ ~ ~ ~ ~ ~ ~ ~ ~ | 2 |
| 9 | ~ ~ ~ ~ ~ ~ ~ ~ ~ ~ | 3 |
| 10 | ~ ~ ~ ~ ~ ~ ~ ~ ~ ~ | 3 |
| 11 | ~ ~ ~ ~ ~ ~ ~ ~ ~ ~ | 3 |
| ⋮ | ⋮ | ⋮ |

IMAGE PROCESSING METHOD AND APPARATUS

BACKGROUND OF THE INVENTION

1. Field of the Invention

The present invention relates to an image processing apparatus and method and, more particularly, to an image processing apparatus and method for outputting portions of multiple number of documents, wherein said portions are identified by certain image attributes.

2. Description of the Related Art

In a conventional image processing apparatus that processes an input image and outputs the processed image, even when an image to be processed is a set of a plurality of image regions with different attributes, it is a common practice to output these image regions without changing their layout.

For example, in an image processing apparatus that displays an input document image, one page of input document images is directly displayed on a display, or the respective pages are simply reduced in scale, and a plurality of pages are displayed on the display like thumbnail display.

However, in these prior arts, an output image may often include an image region having an unwanted attribute.

For example, when a document image is displayed in a reduced scale, characters in that document become illegible since they become very small. Hence, the image must be enlarged to a scale that allows the operator to read the document. In this case, the entire document cannot often be displayed on the display. For this reason, the operator has to move the displayed document image in the horizontal or vertical direction to display a desired position of the document.

When the document image includes a photograph, figure, table, or the like, it is inconvenient to display the entire document image, instead of only the text portion of interest of the document image.

Upon outputting from a printer, even when the operator requires text in a given page, if that page includes a photograph, figure, and the like, a long output time is required to print out that page.

SUMMARY OF THE INVENTION

The present invention has been made to solve the conventional problems, and has as its object to provide an image processing apparatus and method, which can efficiently output images.

In order to achieve the above object, an image processing method according to the present invention comprises:
  a selection instruction step of instructing to select an image and image attribute, and to extract and output an image region with a selected attribute; and
  a extraction output step of segmenting an image selected in the selection instruction step into image regions with different attributes, and extracting and outputting an image region with the attribute selected in the selection instruction step from the segmented image regions.

The extraction output step preferably includes:
  a step of recognizing a continuous pixel group having a predetermined density in an image as a rectangular region;
  a step of identifying an attribute of the rectangular region using a width, height, area, and pixel density of the rectangular region; and
  a step of determining the attribute of the rectangular region by computing and comparing local histograms of the rectangular region.

Another image processing method according to the present invention comprises:
  an image selection step of selecting an image;
  a text extraction instruction step of instructing to extract an image region with a text attribute; and
  s text output step of segmenting the image selected in the image selection step into image regions having different attributes, and extracting and outputting an image region with the text attribute from the segmented image regions in accordance with an instruction issued in the text extraction instruction step.

The text output step preferably comprises a text display step of displaying the extracted image region.

The image processing method preferably further comprises:
  a displayed text change instruction step of instructing to change the image region displayed in the text display step to another image region with a text attribute; and
  a display change step of changing the image region to be displayed in accordance with an instruction issued in the displayed text change instruction step.

The text display step is preferably capable of displaying a plurality of image regions with a text attribute.

The image processing method preferably further comprises:
  a selection instruction step of instructing to select an image region that requests to display a pre-segmentation image, which includes that image region, from the image regions selected in the text display step, and to display the pre-segmentation image; and
  a pre-segmentation image display step of retrieving and displaying the pre-segmentation image including the selected image region on the basis of the image region selected in the selection instruction step.

The text output step preferably includes:
  a step of recognizing a continuous pixel group having a predetermined density in an image as a rectangular region;
  a step of identifying an attribute of the rectangular region using a width, height, area, and pixel density of the rectangular region; and
  a step of determining the attribute of the rectangular region by computing and comparing local histograms of the rectangular region.

An image processing apparatus according to the present invention comprises:
  image input means for inputting image information;
  segmentation means for segmenting an image input by the image input means into image regions having different attributes;
  extraction means for extracting an image region having a predetermined attribute from the image regions segmented by the segmentation means; and
  output means for outputting an image of the image region extracted by the extraction means.

The output means preferably comprises display means.

The predetermined attribute is preferably a text attribute.

The image input means preferably comprises image scanning means for scanning image information.

The output means can preferably retrieve and output the input image from the extracted image region.

The segmentation means preferably recognizes a rectangle by detecting continuous pixels having a predetermined density, identifies an attribute of the rectangle using a width, height, area, and pixel density of an area defined by the rectangle, and determines the attribute of the region by computing and comparing local histograms of the region.

A computer readable memory according to the present invention stores:

a program module for acquiring an image & image attribute selection instruction, and an extraction output instruction of an image region having a selected attribute; and a program module for segmenting an image based on the selection instruction acquired by the program into image regions having different attributes, and extracting and outputting an image region having an attribute based on the selection instruction acquired by the program from the segmented image regions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is an explanatory view of a document management table used in the image processing apparatus according to the first embodiment of the present invention;

FIG. 5 is an explanatory view of a page management table used in the image processing apparatus according to the first embodiment of the present invention;

FIG. 6 is an explanatory view of a node table used in the image processing apparatus according to the first embodiment of the present invention;

FIG. 12 is an explanatory view of a text block management table used in the image processing apparatus according to the second embodiment of the present invention;

DETAILED DESCRIPTION OF THE PREFERRED EMBODIMENTS

The preferred embodiments of the present invention will be explained in detail hereinafter with reference to the accompanying drawings. Note that the relative layouts of the building elements, program modules, and the like, numerical values such as resolution, and the like described in the following embodiments do not limit the scope of the present invention unless otherwise specified.

[First Embodiment]

An image processing apparatus according to the first embodiment of the present invention will be described below using FIGS. 1 to 10. The image processing apparatus according to this embodiment stores a scanned document image in a magneto-optical disk together with information for retrieval, and reads out image data stored in the magneto-optical disk on the basis of the query information to display and print it out. In this case, the image processing apparatus is characterized in that the apparatus can extract and output a character region alone in an image.

Figure 1:
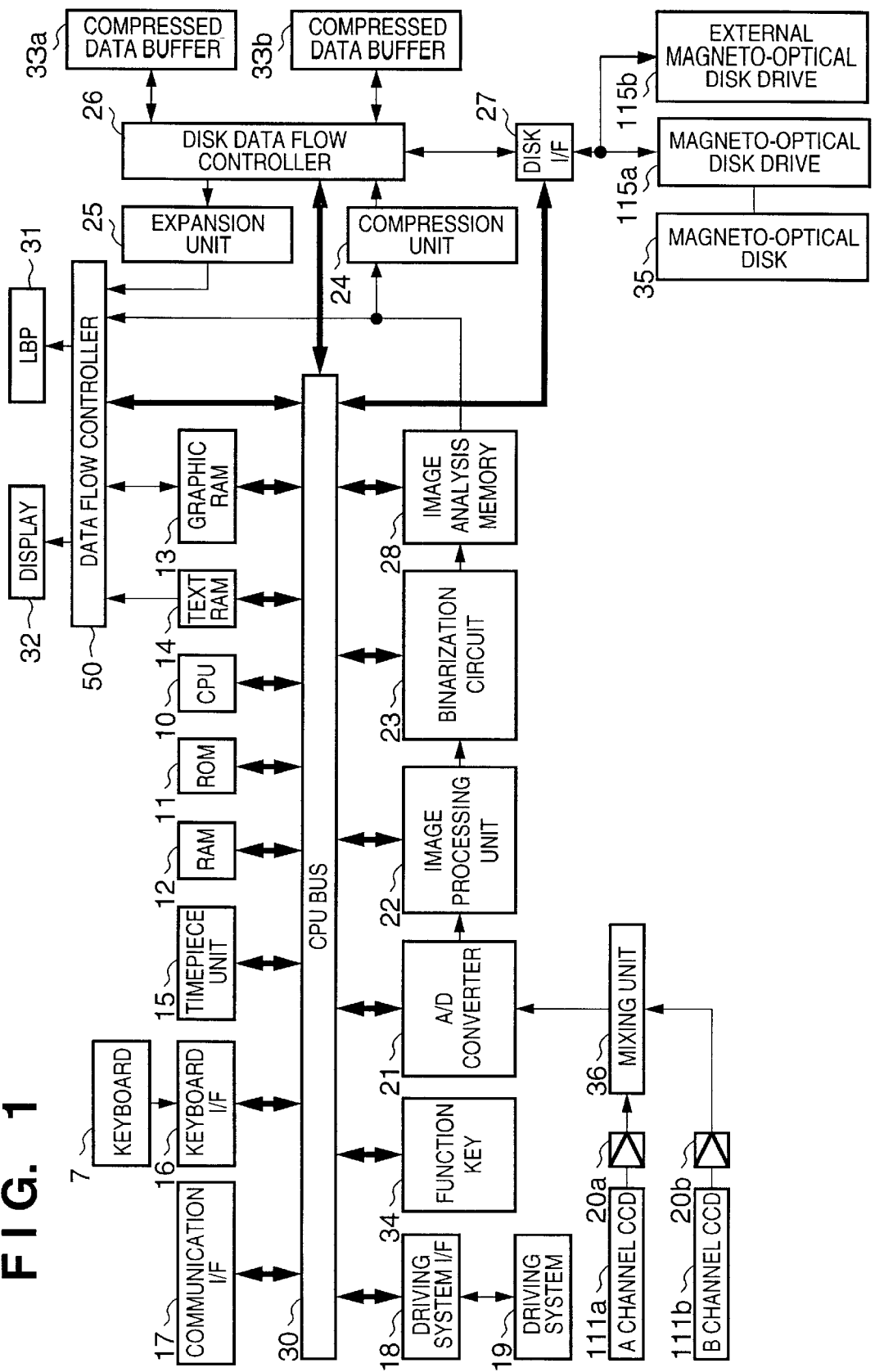
FIG. 1 is a block diagram showing the overall arrangement of an image processing apparatus according to the first embodiment of the present invention.
Figure 2:
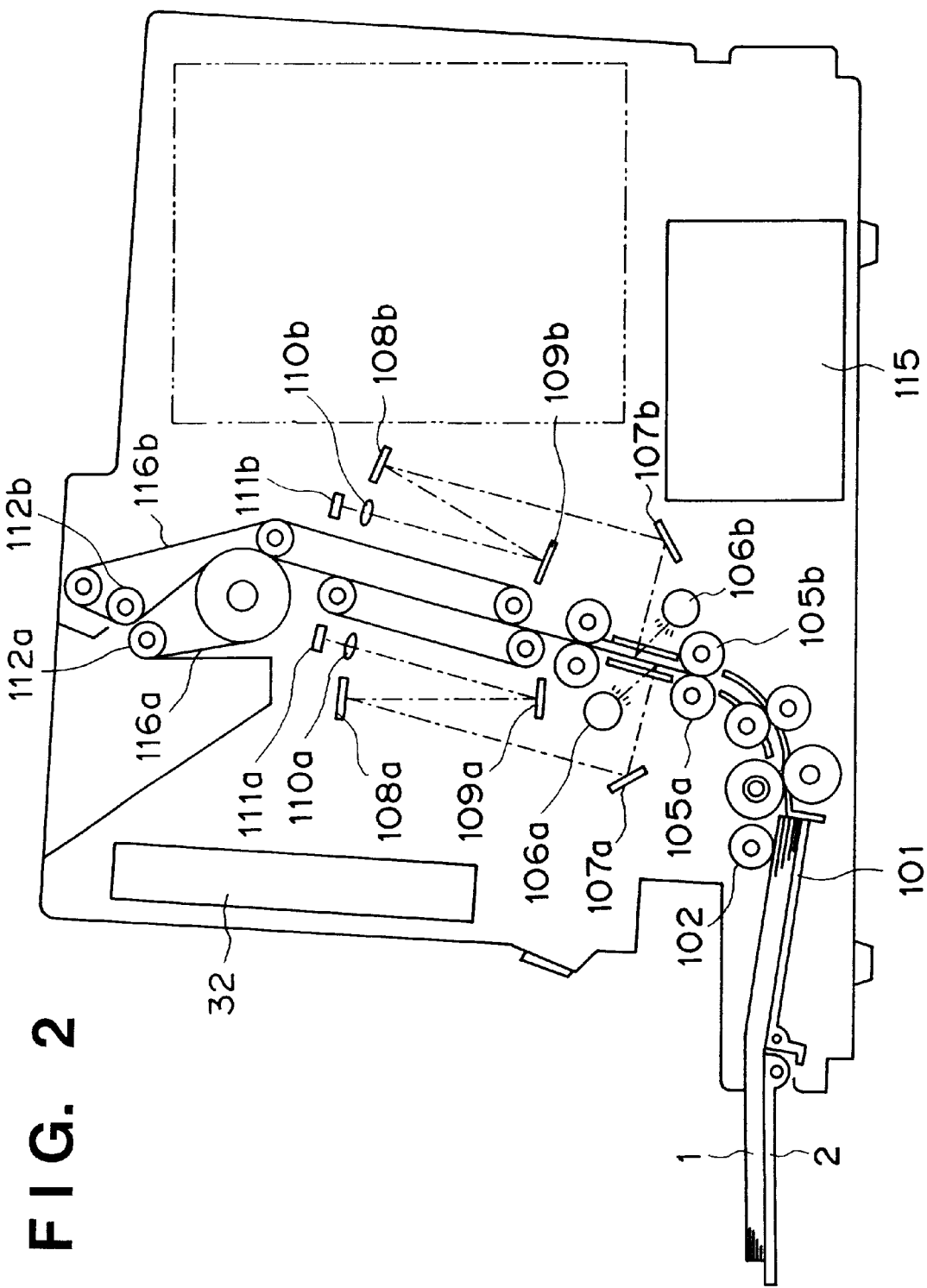
FIG. 2 is a sectional view showing the arrangement of an optical system and driving system of the image processing apparatus according to the first embodiment of the present invention.
Figure 3:
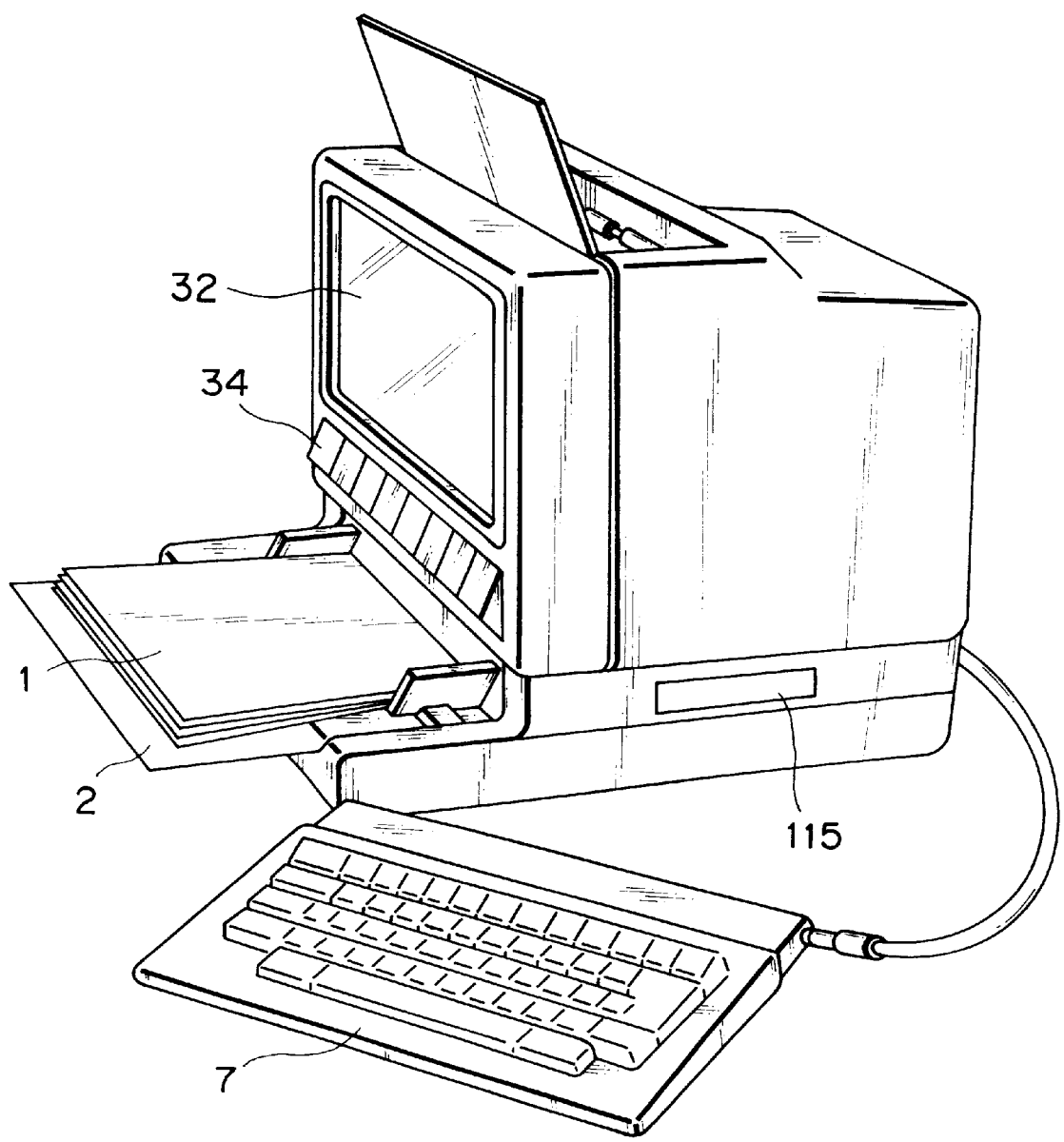
FIG. 3 is a perspective view showing the outer appearance of the image processing apparatus according to the first embodiment of the present invention.

FIG. 1 is a block diagram showing the overall arrangement of the image processing apparatus according to this embodiment, FIG. 2 is a schematic sectional view showing the arrangement of an optical system and driving system of a scanning means of the apparatus of this embodiment, and FIG. 3 shows the outer appearance of the apparatus of this embodiment.

Referring to FIG. 1, reference numeral 10 denotes a microprocessor serving as a CPU; 11, a ROM which stores an operation program of the CPU; 12, a RAM which includes a work area for the CPU, and a load area of data and programs read out from a magneto-optical disk storage device; 15, a timepiece unit connected to a system bus 30; 16, a keyboard interface circuit for connecting a keyboard 7 and the system bus 30; 17, a communication interface circuit for connecting, e.g., another computer to input/output image data; 50, a data flow controller for controlling the data flow among a liquid crystal display 32, an LBP 31, a text RAM 14, a graphic RAM 13, the system bus 30, and the like; 18, a driving system interface circuit for connecting a driving system 19 of an image scanning device and the system bus 30; 111a, a CCD (channel A) for scanning one surface of a page of original documents; 111b, a CCD (channel B) for scanning the other surface of the page; 20a and 20b, amplifiers; 36, a mixing unit for mixing image signals of channels A and B; 21, an A/D converter for converting an image signal output from the CCDs into a digital signal; 22, an image processing unit for adjusting the density and contrast of an image signal; 23, a binarization circuit for converting the output from the image processing unit into binary image data; and 28, an image analysis memory for storing the binary image data and analyzing the stored image data.

Furthermore, reference numeral 34 denotes function keys; 24, a compression unit for compressing bitmap image data stored in the image analysis memory; 25, an expansion unit for expanding compressed image data; and 33a and 33b, compressed data buffers for storing compressed data. Reference numeral 27 denotes a disk interface circuit for inputting/outputting data between magneto-optical disk drives 115a and 115b, and the system bus 30. The compression unit 24, expansion unit 25, and compressed data buffers 33a and 33b are connected to a disk data flow controller 26.

Referring to FIGS. 2 and 3, reference numeral 1 denotes original documents that bears document image information; 2 and 101, tables for original documents; 102, 105a, and 105b, feed rollers; 106a and 106b, fluorescent lamps for illuminating an original document; 107a, 107b, 108a, 108b, 109a, and 109b, mirrors; 110a and 110b, lenses; and 111a and 111b, CCDs serving as scanning elements. Reference numerals 112a and 112b denote discharge rollers; and 116a and 116b, conveyor belts. As described above using FIG. 1, reference numeral 7 denotes the keyboard; 32, the liquid crystal display; 34, the function keys; and 115, the magneto-optical disk drive.

The operation of this embodiment will be described in the order of (1) power ON, (2) a scanning process of original documents, (3) a recording process of document images, and (4) a display process of text blocks, and a change process of displayed text blocks with reference to FIGS. 1, 2, and 3.

(1) Power ON

When the operator turns on a power switch (not shown), the CPU 10 checks the RAM, initializes internal parameters, and clears the liquid crystal display in accordance with a program recorded on the ROM 11. After these processes, the CPU 10 waits until the operator operates a function key 37 or keyboard 7.

(2) Scanning Process of Original Documents

As shown in FIG. 3, when the operator inputs a scan instruction using one of the function keys 34 while original documents are placed on the table 2, the documents are fed one by one by the feed roller 102 and the like. Document images are supplied to the CCDs 111 via the fluorescent lamps 106, mirrors 107, and the like and scanned by the CCDs 111. Upon completion of scanning, the documents are discharged outside the apparatus by the discharge rollers 112 and the like.

(3) Recording Process of Image

Each scanned document image is automatically supplied to the compression unit 24, and is compressed by a known image compression method such as MH, MR, MMR, or the like. The compressed image data is stored in the compressed data buffer 33a or 33b. The stored compressed image data is sent to the magneto-optical disk drive 115 via the disk interface circuit 27 in accordance with operator's instruction, and is written in a magneto-optical disk 35. When index data for search is input, that search information is recorded on the magneto-optical disk 35 in association with the corresponding image or document.

How the scanned document images are managed in this embodiment will be explained below.

In the magneto-optical disk, the scanned document images are managed in units of files. Each of the files comprises a plurality of images corresponding to a plurality of pages of original documents (or an image corresponding to one page of original documents). Information that pertains to each file is recorded in a document management table shown in FIG. 4, and information that pertains to each page of the recorded document is recorded in a page management table shown in FIG. 5. The position of image data on the magneto-optical disk, i.e., the position of the aforementioned compressed image data is managed by a data table called a node table held on the magneto-optical disk 35.

The page management table stores a value called a "node number" indicating a given record in the node table corresponding to each page.

The node table stores a FAT (file allocation table) entry indicating the position on the disk where the data is stored, and the size (the number of bytes) of the data as one record.

By using these three tables, an image of the page the operator wants can be read out from the magneto-optical disk and can be displayed.

(4) Display Process of Text Block, and Change Process of Displayed Text Block

The process executed in this embodiment when the operator instructs text block display will be explained below.

A text block display instruction is issued after the operator selects a document image file to be displayed. For example, the operator can issue this instruction after observing the displayed image of a page with desired text and determines that the image is preferably displayed in the text block display mode. The text block display process is executed when the operator instructs the text block display mode using one of the function keys 34.

Figure 7:
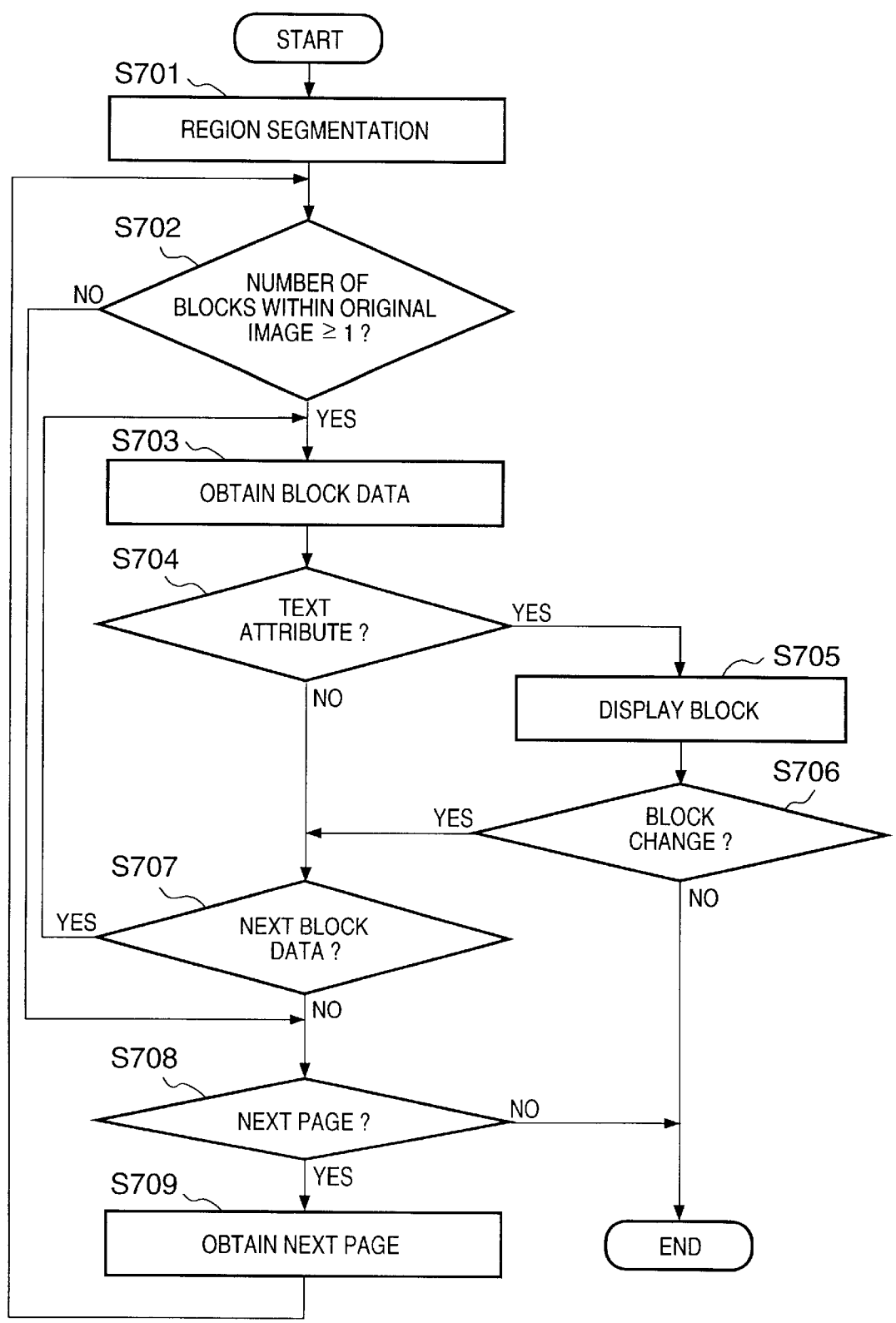
FIG. 7 is a flow chart showing the text block display process of the image processing apparatus according to the first embodiment of the present invention.

FIG. 7 is a flow chart showing the outline of the text block display process upon reception of the text block display instruction. The respective processes of that flow will be described below.

{S701}: Upon detection of the text block display instruction, a document image is segmented into regions using a block selection technique. Region segmentation is done by the CPU 10 on the basis of a program on the ROM 11.

This technique is disclosed in Japanese Patent Laid-Open No. 6-68301 (corresponding U.S. Pat. No. 5,680,479). With this technique, attributes (text, title, halftone figure, table, and the like), positions on an image, sizes, and the like of individual regions can be obtained as layout analysis data. More specifically, a rectangle is recognized by detecting continuous black pixels of a scanned image, and the attribute of that rectangle is identified using the width, height, area, and pixel density of a region indicated by the rectangle. Local histograms of the region are computed and compared to determine the attribute of that region.

Figure 8:
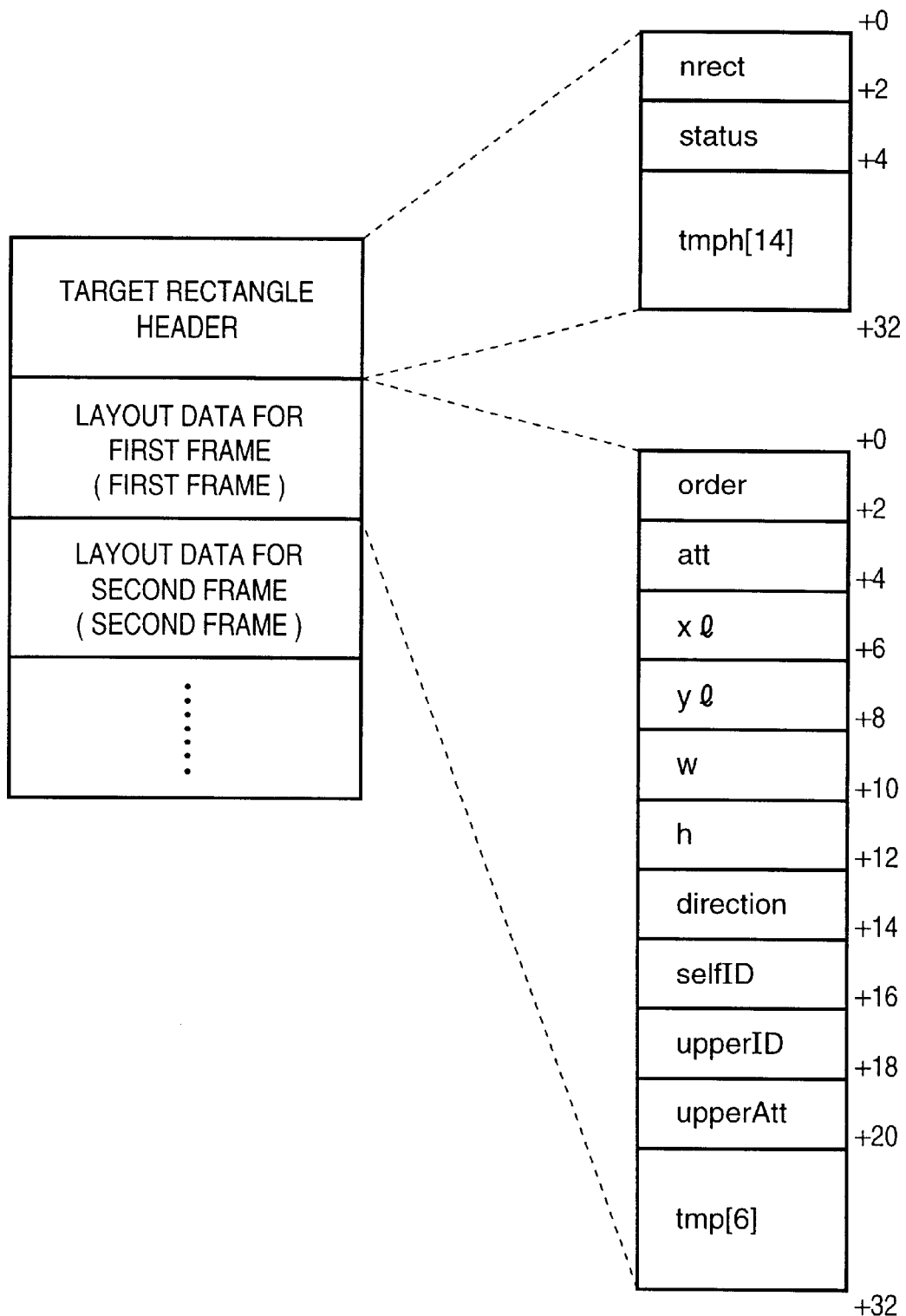
FIG. 8 shows the data format of a layout analysis result in region segmentation in the image processing apparatus according to the first embodiment of the present invention.

FIG. 8 shows the data format of layout analysis results.

Referring to FIG. 8, items "target rectangle header" and "layout data" respectively have the following meanings:

[Target Rectangle Header]

nrect: the number of rectangles in target rectangle status: status of layout result of target rectangle

[Layout Data]

order: order att: attribute x1: upper left x-coordinate y1: upper left y-coordinate w: width h: height direction: column direction selfID: self block identification number upperID: parent block identification number upperAtt: parent block attribute The following attributes of a block can be identified.

[Attribute]

root text white unknown noise picture noise invalid small text in figure
vertically elongated separator
horizontally elongated separator
underline
frame
deformed separator
table
cell
empty cell
halftone figure
line image
figure in figure or halftone figure
halftone figure in figure or halftone figure
title
caption {S702}: The number of blocks in a document image corresponding to a page of original documents is checked based on the layout analysis result data. If the number of blocks is 1 or more, since at least one block is present, {S703} is executed. If the number of blocks is 0, {S708} is executed.

{S703}: Block data for one frame is obtained.

{S704}: It is checked if the attribute of the block data obtained in {S703} is a text attribute. If the obtained block data is text data, {S705} is executed. If the attribute of the block data is not a text attribute, {S707} is executed.

{S705}: A display process of the block which is determined to be "text" in {S704} is executed. In the display process, a record of the page of interest of the document is selected from the page management table shown in FIG. 5 on the basis of the page number of the page that includes the selected block, and the block data of the selected block, and its node number is specified, thus obtaining a FAT entry of the page of interest from the node table. By tracing the FAT, a logic address sequence is obtained to specify desired compressed image data on the magneto-optical disk. After that, the CPU 10 controls the disk interface 27 to read out the compressed image data from the magneto-optical disk drive 115.

At this time, the disk data flow controller 26 is controlled by the CPU 10 to supply the compressed image data from the disk interface 27 to the expansion unit 25. The data flow controller 50 is controlled by the CPU 10 to store image data output from the expansion unit 25 in the graphic RAM 13, and to display the text block on the display 32 on the basis of the position information (x1, y1, w, h) of the selected block data.

In this manner, image data of the text block is read out from the magneto-optical disk, and is displayed on the liquid crystal display 32. At this time, the process started in response to the text block display instruction from the operator ends, and the control waits for the next displayed text block change instruction.

{S706}: It is checked if a displayed block change instruction is issued. Upon reception of the displayed block change instruction by the operator, {S707} is executed. If an instruction other than the displayed block change instruction is received, this process ends.

{S707}: It is checked if the next block data is present. If the next block data is present, the flow returns to the process of {S703}; otherwise, {S708} is executed.

{S708}: It is checked if the next page is present. If the next page is present, {S709} is executed; otherwise, the process ends.

{S709}: The page number is updated to obtain the layout analysis result of the next page, and the flow returns to the process of {S702}.

With the aforementioned process, a text block is displayed, and the displayed text block is changed.

Figure 9:
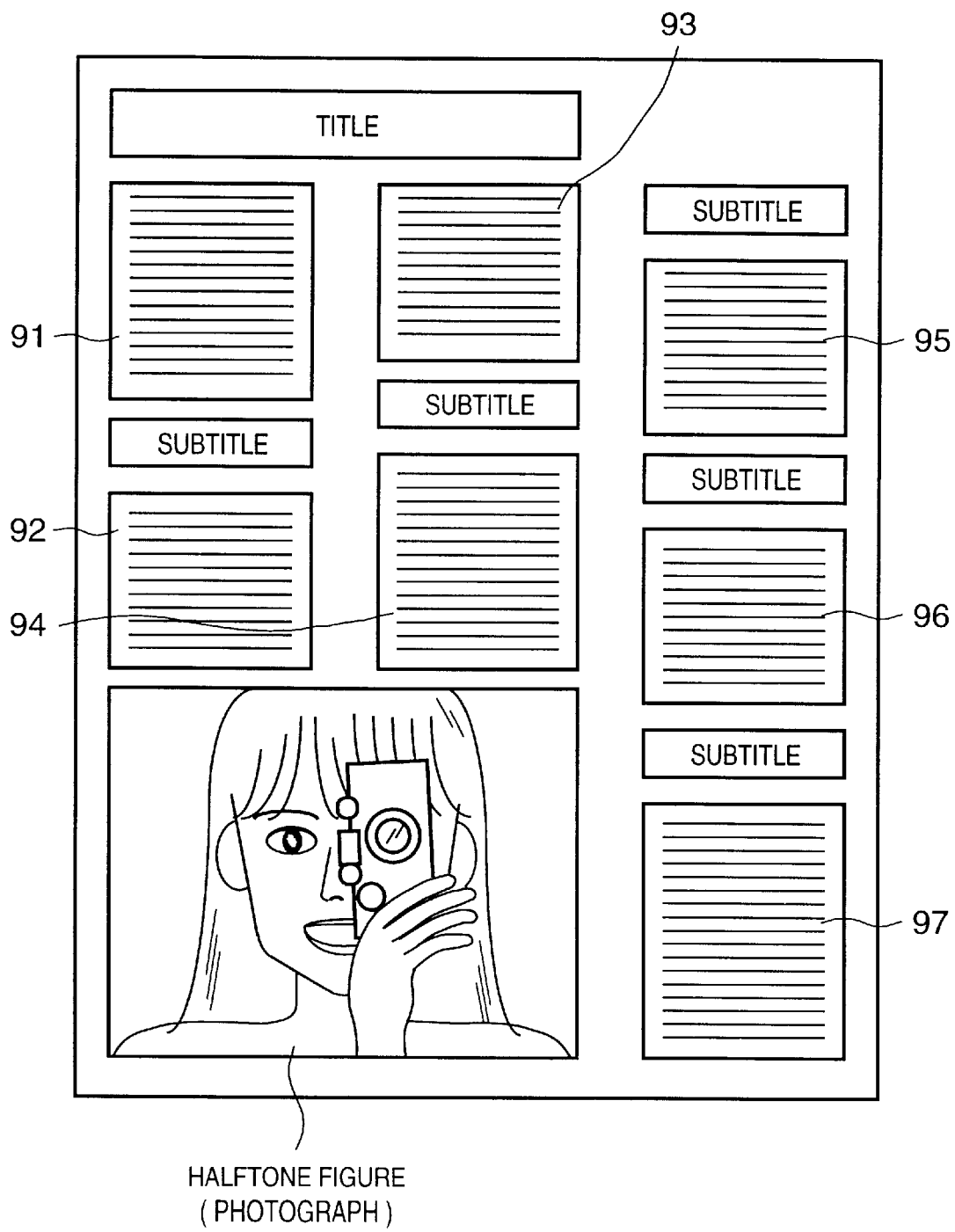
FIG. 9 is an explanatory view showing an example of an input image which undergoes the text block display process of the image processing apparatus according to the first embodiment of the present invention.
Figure 10:
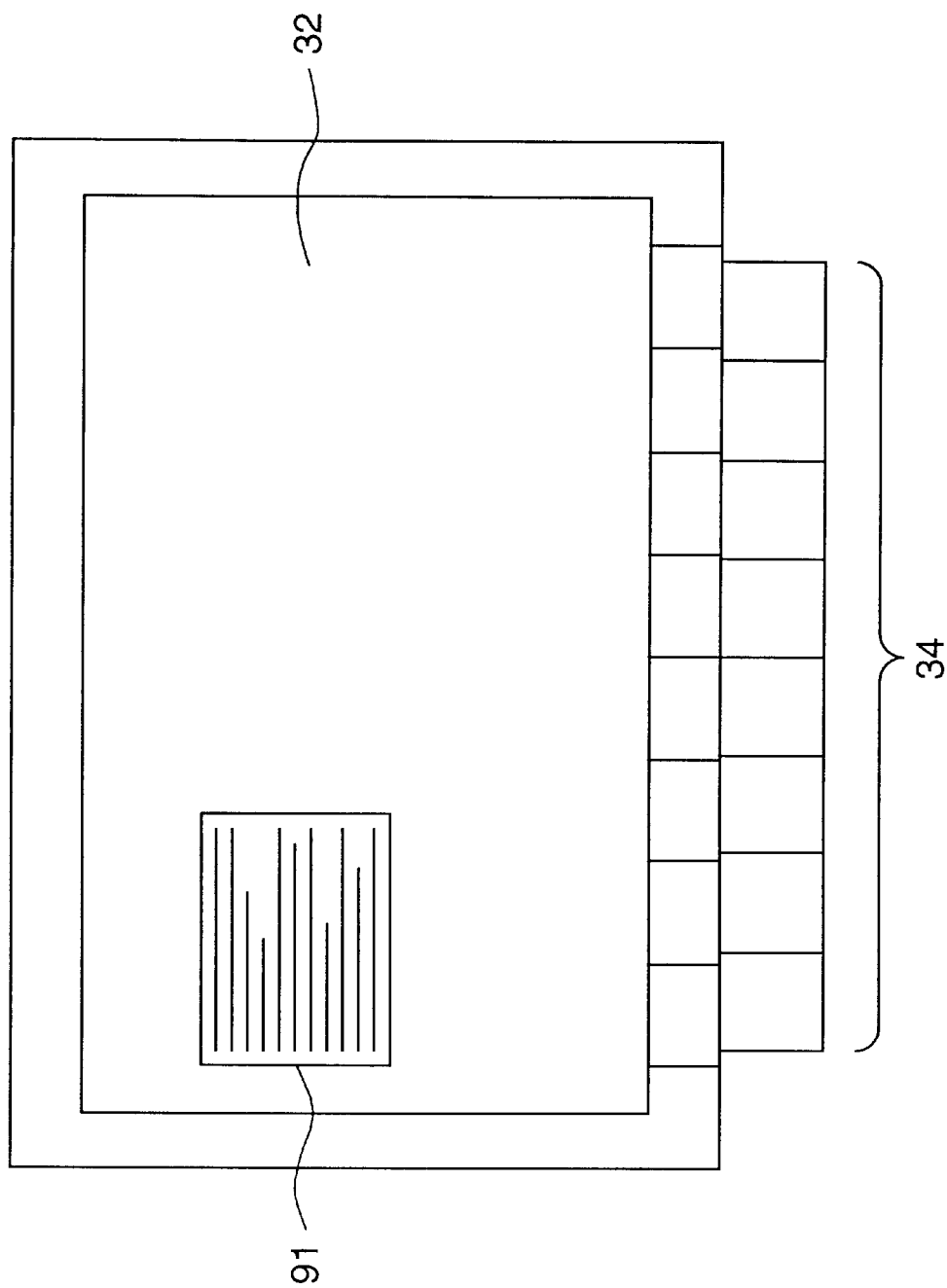
FIG. 10 is an explanatory view of a text block display window of the image processing apparatus according to the first embodiment of the present invention.

An example of the text block display process will be explained below. For example, assume that a document image shown in FIG. 9 is input, and the operator selects this image and issues a text block display instruction using one of the function keys 34. Then, as shown in FIG. 10, an image 91 is initially displayed on the display 32, and every time the operator issues a displayed text block change instruction using one of the function keys 34, text blocks are displayed of the order of image 92 and image 93.

As described above, since only text is extracted from a plurality of document pages that also include a figure, table, and the like, and the displayed text blocks can be changed in the order to be read, the document contents can be efficiently recognized. Also, even when the display is small, the operation load can be reduced.

In this embodiment, the region segmentation is executed upon reception of the text block display instruction. Alternatively, region segmentation may be done at an arbitrary timing after the document image is input until an external text block display instruction is received.

The layout analysis result data obtained by region segmentation are not recorded on a recording medium such as a magneto-optical disk or the like. Alternatively, the layout analysis result data may be recorded in association with images, and upon reception of a text block display instruction, the text block display process may be executed by reading out the recorded layout analysis result data.

Furthermore, the next block to be read is displayed upon reception of a displayed block change instruction. Alternatively, the previously read text block, a text block an arbitrary number of blocks ahead of the current block, the first text block of each page, or the like may be instructed and displayed by the same processes.

[Second Embodiment]

An image processing apparatus according to the second embodiment of the present invention will be described below using FIGS. 11 to 15. The image processing apparatus according to this embodiment is different from that in the first embodiment in that a plurality of extracted text blocks can be simultaneously displayed on a display, and by selecting an arbitrary one of the displayed text blocks, a page that includes the selected block can be displayed. Other arrangements and operations of this embodiment are the same as those in the first embodiment. Therefore, the same reference numerals in this embodiment denote the same parts as those in the first embodiment, and a detailed description thereof will be omitted. Especially the hardware arrangement of the image processing apparatus is the same as that in the first embodiment, as has been described earlier with reference to FIGS. 1 to 3.

The operation of this embodiment will be explained below. Since the operation upon power ON and scan of an document image are the same as those in the first embodiment, a detailed description thereof will be omitted.

When the operator selects a document file to be displayed from the scanned or externally input image data, and directs a multiple text block display mode, a text block recording process is executed, and a display process of the text blocks is then executed. When the operator selects one of the displayed text blocks, and inputs a page display instruction, a display process of a page that includes the selected block is executed.

These processes will be described in turn below.

(1) Recording Process of Text Block

Figure 11:
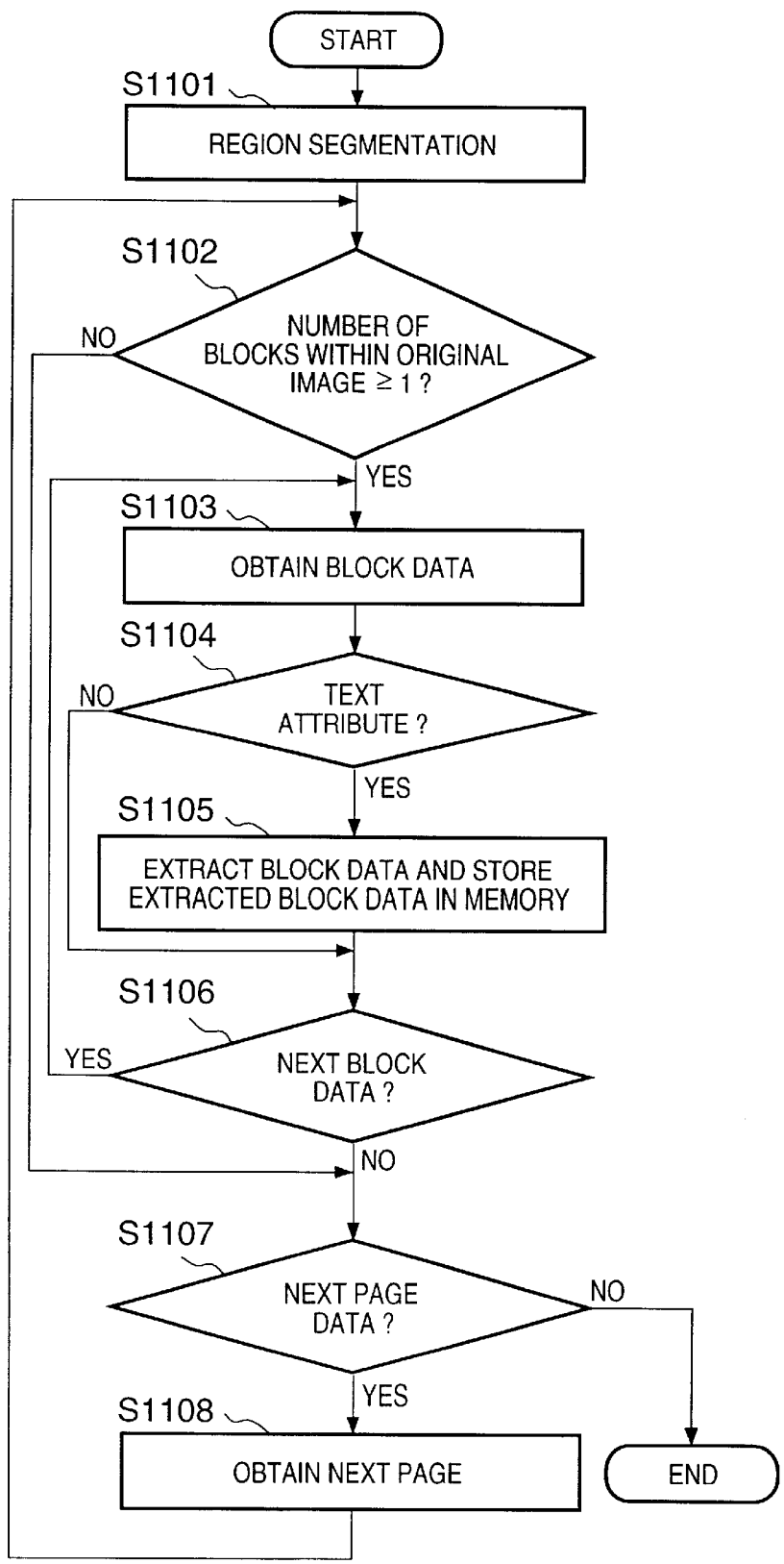
FIG. 11 is a flow chart showing the text block extraction process of an image processing apparatus according to the second embodiment of the present invention.

FIG. 11 is a flow chart showing the outline of the text block recording process. The respective processes of this flow will be explained below.

{S1101}: An input document image is segmented into regions using the block selection technique as in the first embodiment to obtain layout analysis result data.

{S1102}: The number of blocks in the document image is checked using the layout analysis result data. If the number of blocks is 1 or more, since at least one block is present, {S1103} is executed. If the number of blocks is 0, since no block is present, {S1107} is executed.

{S1103}: Data of the first block is obtained.

{S1104}: The attribute of the block data is checked. If the attribute of the block data is "text", {S1105} is executed. If the attribute of the block data is not "text", {S1106} is executed.

{S1105}: The block data appended with a text attribute is stored in the RAM 12 as a text block management table shown in FIG. 12.

{S1106}: It is checked if the next block data is present. If the next block data is present, the flow returns to the process of {S1103}; otherwise, {S1107} is executed.

{S1107}: It is checked if the next page data is present. If the next page data is present, {S1108} is executed; otherwise, the process ends.

{S1108} The page number is updated to obtain layout analysis result data of the next page, and the flow returns to the process of {S1102}.

As a result of the aforementioned processes for all block data, only block data appended with a text attribute are stored in the memory.

In this embodiment, the text block recording process is executed when the operator designates the multiple text block display mode, but may be executed at an arbitrary timing after an image is input until the multiple text block display mode is designated.

(2) Multiple Text Block Display

Figure 13:
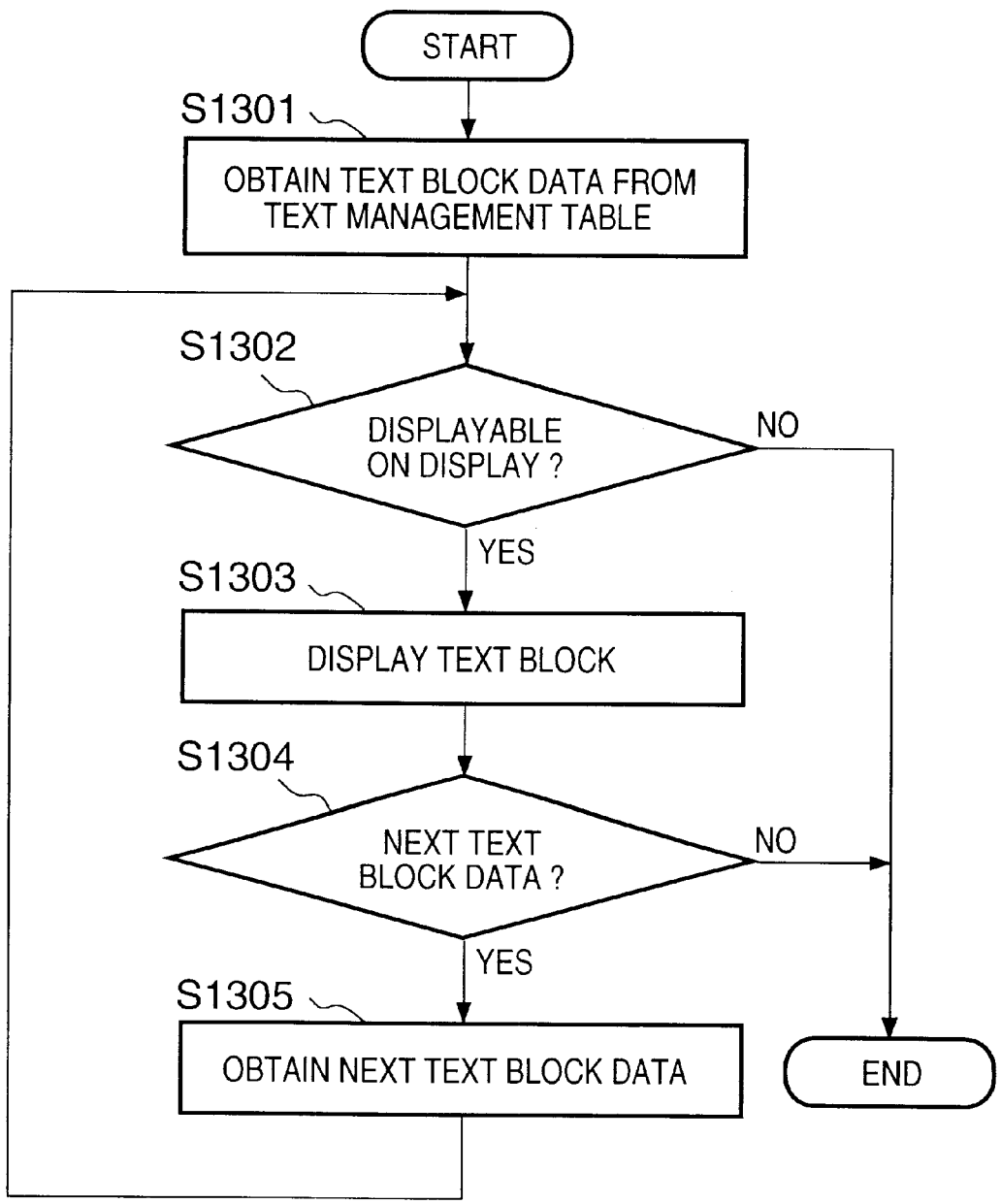
FIG. 13 is a flow chart showing the multiple text block display process of the image processing apparatus according to the second embodiment of the present invention.

FIG. 13 is a flow chart showing the outline of the multiple text block display process. The respective processes of this flow will be explained below.

{S1301}: Data of the first text block is acquired from the text block management table.

{S1302}: It is checked if the text block of interest can be displayed on the display. In this embodiment, the number of text blocks that can be displayed on the display is 8. If the number of currently displayed blocks is smaller than 8, {S1303} is executed. If eight blocks have already been displayed, the process ends.

{S1303}: The text block of interest is displayed. Initially, a record of the page of interest of the document is selected from a page management table shown in FIG. 5 on the basis of the page number of the page that includes the block of interest, and its block data obtained in {S1301}. Furthermore, since a node number is specified, a FAT entry of the page of interest is acquired from a node table shown in FIG. 6. Subsequently, by using the aforementioned FAT, a logic address sequence is obtained to specify desired compressed image data on the magneto-optical disk. After that, the CPU 10 controls the disk interface 27 so that the magneto-optical disk drive 115 reads out the compressed image data from the magneto-optical disk 35. At this time, the disk data flow controller 26 is controlled by the CPU 10 to supply the compressed image data from the disk interface 27 to the expansion unit 25. The data flow controller 50 is controlled by the CPU 10 to store image data output from the expansion unit 25 in the graphic RAM 13, and to display the text block on the display 32 on the basis of the position information (x1, y1, w, h) of the selected block data.

{S1304}: It is checked if the next text block is present in the text block management file. If the next text block is present, {S1305} is executed; otherwise, the process ends.

{S1305}: The next text block data is acquired from the text block management file, and the flow returns to the process of {S1302}.

(3) Page Display upon Selection of Text Block

Figure 14:
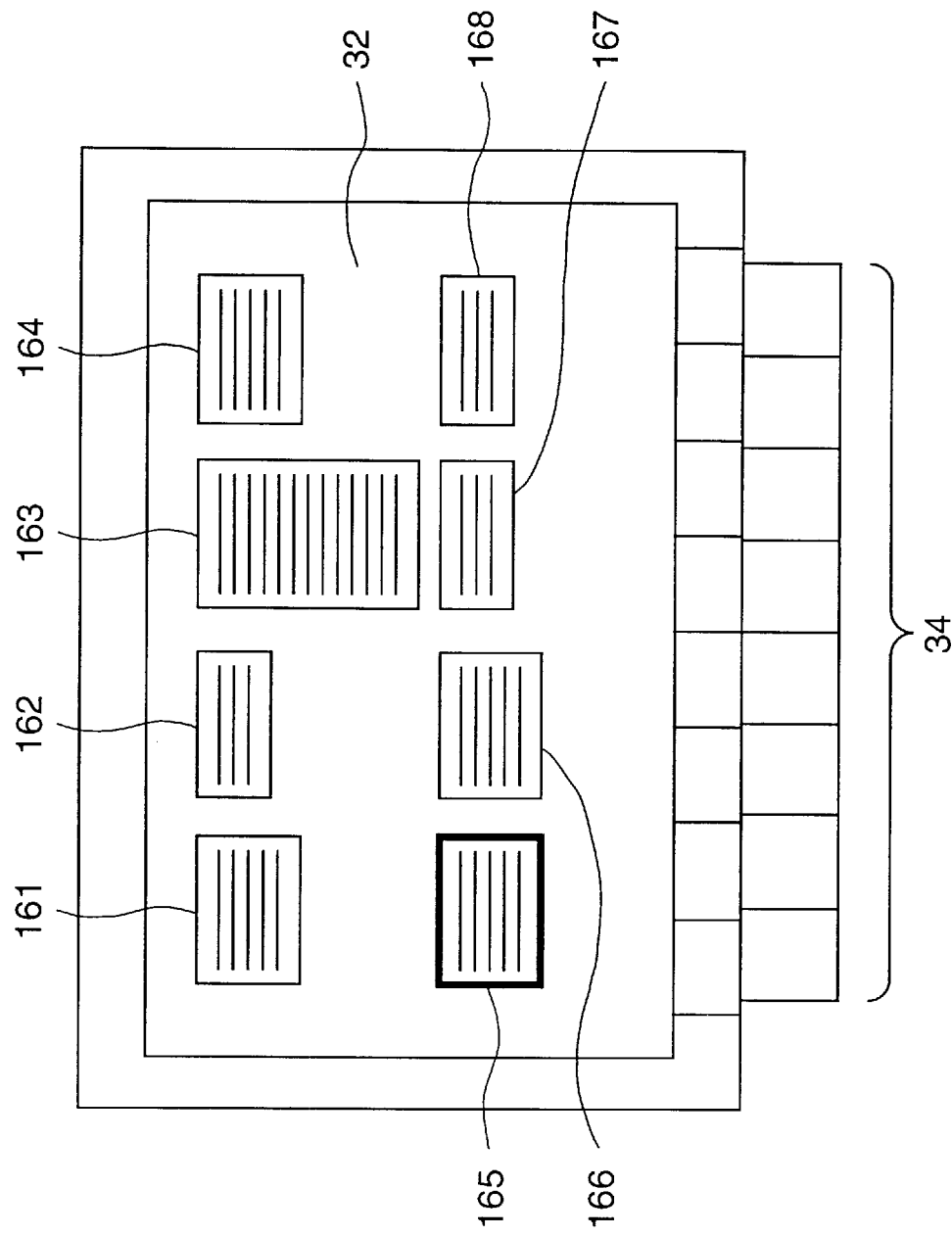
FIG. 14 is an explanatory view of a window for displaying a plurality of text blocks in the image processing apparatus according to the second embodiment of the present invention.

When the operator selects a document to be displayed and designates a multiple text block display mode, a plurality of text blocks (161–168) are displayed on the display 32, as shown in FIG. 14.

The operator then can select an arbitrary one of the text blocks displayed on the display. The text blocks displayed on the display can be individually selected, and the selected text block (165) is bounded by a bold frame or displayed in a different color.

Data corresponding to the selected text block is checked using the text block management file to acquire block data and page number data. Based on these data, the display process of a page including the selected page is executed.

Figure 15:
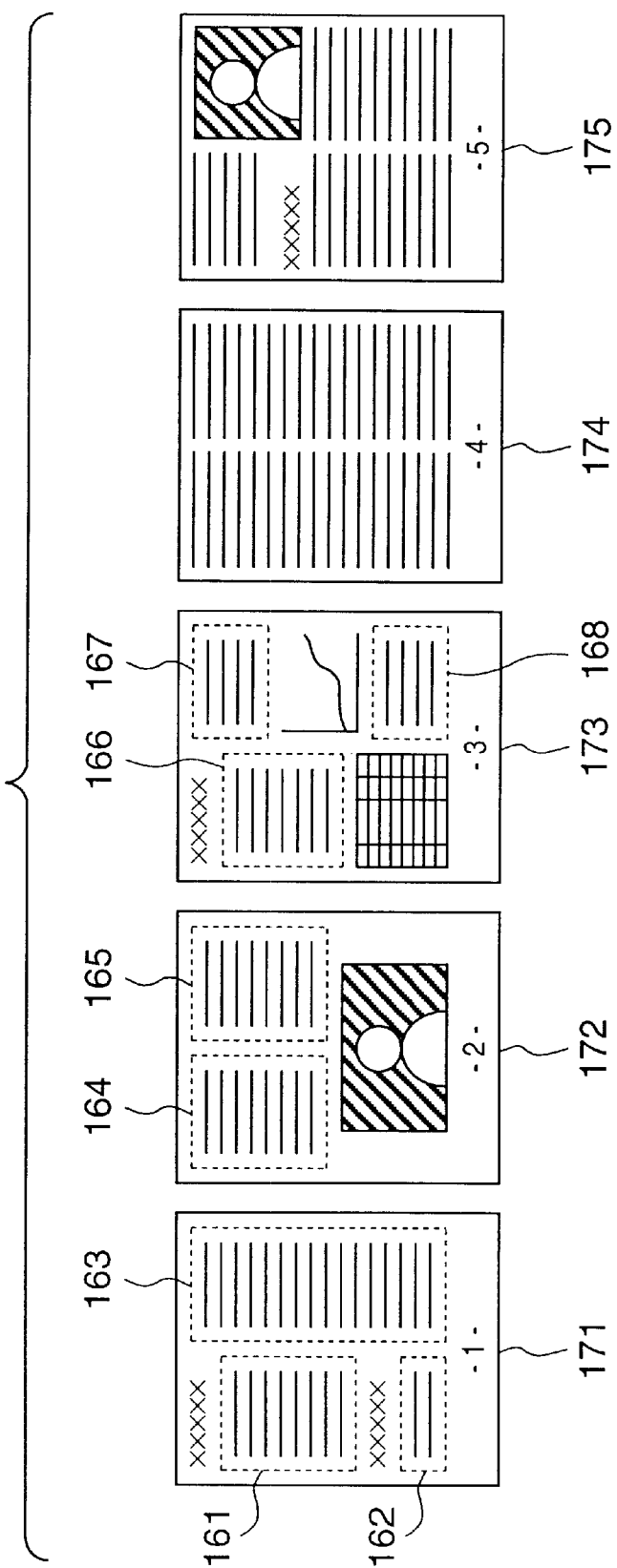
FIG. 15 is an explanatory view showing a page search process using a text block in the image processing apparatus according to the second embodiment of the present invention.

For example, assume that the operator selects a document including five pages, i.e., images 171 to 175, as shown in FIG. 15, and designates the multiple text block display mode to display text blocks, as shown in FIG. 14. In this case, text blocks 161, 162, and 163 in the image 171 (first page), text blocks 164 and 165 in the image 172 (second page), and text blocks 166, 167, and 168 in the image 173 are displayed. When the operator selects the text block 165 from those displayed using a pointing device, the image of the entire page 172 that includes the selected text block is displayed on the display.

In this way, when a plurality of text blocks alone in document images can be displayed, efficient display can be attained if no figure, table, or the like is required. Also, since a desired page can be displayed by selecting a text block, document search can be done effectively.

In this embodiment, the number of text blocks that can be displayed on the display is 8. However, the present invention is not limited to such specific value, and the number of text blocks may be set in correspondence with the display size.

Furthermore, in this embodiment, text blocks are displayed in the order of appearance from the first page of document images. However, one text block may be extracted from each page, and may be displayed on the display.

[Other Embodiments]

In the above embodiments, a text block is extracted and displayed from a plurality of different types of blocks. However, the attribute of a block to be extracted is not limited to "text", and a halftone figure such as a photograph, a title, and the like may be extracted by the same arrangement. In such case, by extracting a block with that attribute, the required contents can be efficiently recognized, and even when the display is small, the operation load can be reduced. Also, in the above embodiments, a block having a given attribute is extracted upon display. However, the present invention is not limited to display but may be applied to print out.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus shown in FIG. 1, and reading out and executing the program code stored in the storage medium by a computer (or a CPU or MPU) of the system or apparatus. Especially, when such storage medium is applied to the apparatus shown in FIG. 1, the ROM 11 may be used as the "storage medium", or a storage device such as a hard disk that records the program code of software which can implement the functions of the aforementioned embodiments may be separately prepared.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the aforementioned flow charts. That is, the storage medium can store program codes of at least:

an "instruction acquisition module" for acquiring an image & image attribute selection instruction, and an extraction output instruction of an image region with the selected attribute; and an "extraction output module" for segmenting an image based on the selection instruction acquired by the instruction selection module into image regions having different attributes, and extracting and outputting an image region having an attribute from the segmented image regions on the basis of the selection instruction acquired by the instruction acquisition module.

To restate, according to the present invention, an image processing apparatus and method which can efficiently output images can be provided. Especially, according to the image processing apparatus and method of the present invention, the limited output range can be effectively used, and the contents can be easily recognized. Also, only an image region with a required attribute can be effectively output, and image search can be efficiently done.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:

a segmenting step of segmenting an image into a plurality of image regions each having one of a plurality of attributes and a display order;

a designating step of designating one of the plurality of attributes in accordance with an instruction of the operator;

an extraction step of extracting only image regions having the attribute designated in said designating step from the segmented image regions;

a display step of displaying one of the image regions extracted in said extraction step;

an input step of inputting an instruction of the operator; and a changing step of changing, in response to the instruction, the image region displayed in said display step into an image region which has the attribute designated in said designating step and is located in the next position in the display order.

2. The method according to claim 1, wherein said segmenting step includes:

a step of recognizing a continuous pixel group having a predetermined density in the image as a rectangular region;

a step of identifying an attribute of the rectangular region using a width, height, area, and pixel density of the rectangular region; and a step of determining the attribute of the rectangular region by computing and comparing local histograms of the rectangular region.

3. An image processing method according to claim 1, wherein the attribute selected by the operator is a text attribute.

4. An image processing apparatus comprising:

segmentation means for segmenting an image into a plurality of image regions each having one of a plurality of attributes and a display order;

designating means for designating one of the plurality of attributes in accordance with an instruction of the operator;

extraction means for extracting only image regions having the attribute designated by said designating means from the image regions segmented by said segmentation means;

display means for displaying one of the image regions extracted by said extraction means;

input means for inputting an instruction of the operator; and changing means for changing, in response to the instruction, the image region displayed by said display means into an image region which has the attribute designated by the designating means and which is located in the next position in the display order.

5. The apparatus according to claim 4, wherein the attribute selected by the operator is a text attribute.

6. The apparatus according to claim 4, further comprising image input means for inputting the image with a scanner.

7. The apparatus according to claim 4, wherein said segmentation means includes:

recognition means for recognizing a rectangle by detecting continuous pixels having a predetermined density;

identification means for identifying an attribute of the rectangle using a width, height, area, and pixel density of an area defined by the rectangle; and determination means for determining the attribute of the region by computing and comparing local histograms of the region.

8. A computer readable memory storing program codes for causing a computer to execute the steps of:

segmenting an image into a plurality of image regions each having one of a plurality of attributes and a display order;

designating one of the plurality of attributes in accordance with an instruction of the operator;

extracting only image regions having the attribute designated in said designating step from the segmented image regions;

displaying one of the image regions extracted in said extraction step;

inputting an instruction of the operator; and changing, in response to the instruction, the image region displayed in said display step into an image region which has the attribute designated in the designating step and which is located in the next position in the display order.

9. A computer-executable program including program codes for causing a computer to execute the steps of:

segmenting an image into a plurality of image regions each having one of a plurality of attributes and a display order;

designating one of the plurality of attributes in accordance with an instruction of the operator;

extracting only image regions having the attribute designated in said designating step from the segmented image regions;

displaying one of the image regions extracted in said extraction step;

inputting an instruction of the operator; and changing, in response to the instruction, the image region displayed in said display step into an image region which has the attribute designated in the designating step and which is located in the next position in the display order.

10. An image processing method comprising:

a segmenting step of segmenting an image into a plurality of image regions each having one of a plurality of attributes;

an attribute designation step of designating one of the plurality of attributes in accordance with an instruction of the operator;

an extraction step of extracting image regions having the attribute designated in the attribute designation step from the segmented image regions;

a display step of displaying some of the image regions extracted in said extraction step;

an input step of inputting an instruction of the operator;

an image selection step of selecting an image region from among some of the image regions displayed in said display step in accordance with the instruction of the operator; and a pre-segmentation image display step of displaying the pre-segmentation image including the image region selected in said image selection step.

11. An image processing apparatus comprising:

segmenting means for segmenting an image into a plurality of image regions each having one of a plurality of attributes;

attribute designation means for designating one of the plurality of attributes in accordance with an instruction of the operator;

extraction means for extracting image regions having the attribute designated by the attribute designation means from the segmented image regions;

display means for displaying some of the image regions extracted by said extraction means;

input means for inputting an instruction of the operator;

image selection means for selecting an image region from among some of the image regions displayed by said display means in accordance with the instruction of the operator; and pre-segmentation image display means for displaying the pre-segmentation image including the image region selected by said image selection means.

12. A computer readable memory storing program codes for causing a computer to execute the steps of:

segmenting an image into a plurality of image regions each having one of a plurality of attributes;

designating one of the plurality of attributes in accordance with an instruction of the operator;

extracting image regions having the attribute designated in the attribute designation step from the segmented image regions;

displaying some of the image regions extracted in said extraction step;

inputting an instruction of the operator;

selecting an image region from among some of the image regions displayed in said display step in accordance with the instruction of the operator; and displaying the pre-segmentation image including the image region selected in said image selection step.

13. A computer-executable program including program codes for causing a computer to execute the steps of:

segmenting an image into a plurality of image regions each having one of a plurality of attributes;

designating one of the plurality of attributes in accordance with an instruction of the operator;

extracting image regions having the attribute designated in the attribute designation step from the segmented image regions;

displaying some of the image regions extracted in said extraction step;

inputting an instruction of the operator;

selecting an image region from among some of the image regions displayed in said display step in accordance with the instruction of the operator; and displaying the pre-segmentation image including the image region selected in said image selection step.

* * * * *